United States Patent
Chun et al.

(10) Patent No.: US 8,355,331 B2
(45) Date of Patent: Jan. 15, 2013

(54) METHOD FOR TRANSMITTING PDCP STATUS REPORT

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/150,892

(22) Filed: Jun. 1, 2011

(65) Prior Publication Data

US 2011/0228746 A1 Sep. 22, 2011

Related U.S. Application Data

(63) Continuation of application No. 12/405,677, filed on Mar. 17, 2009, now Pat. No. 7,978,616.

(60) Provisional application No. 61/037,309, filed on Mar. 17, 2008, provisional application No. 61/038,470, filed on Mar. 21, 2008.

(30) Foreign Application Priority Data

Mar. 16, 2009 (KR) .................... 10-2009-0022158

(51) Int. Cl.
*H04L 1/00* (2006.01)

(52) U.S. Cl. ................. 370/242; 370/310

(58) Field of Classification Search .......... 370/241, 370/241.1, 242, 252, 310, 328
See application file for complete search history.

(56) References Cited

U.S. PATENT DOCUMENTS

| | | |
|---|---|---|
| 6,445,917 B1 | 9/2002 | Bark et al. |
| 6,594,240 B1 | 7/2003 | Chuah et al. |
| 6,728,918 B1 | 4/2004 | Ikeda et al. |
| 6,862,450 B2 | 3/2005 | Mikola et al. |
| 6,909,718 B1 | 6/2005 | Aramaki et al. |
| 6,963,540 B2 | 11/2005 | Choi et al. |
| 7,171,163 B2 | 1/2007 | Terry et al. |

(Continued)

FOREIGN PATENT DOCUMENTS

CN 1339903 A 3/2002

(Continued)

OTHER PUBLICATIONS

3GPP, "3rd Generation Partnership Project; Technical Specification Group Radio Access Network; Evolved Universal Terrestrial Radio Access (E-UTRA); Packet Data Convergence Protocol (PDCP) specification (Release 8)", 3GPP TS 36.323, V8.2.1, May 1, 2008, pp. 1-25.

(Continued)

*Primary Examiner* — Phirin Sam
*Assistant Examiner* — Mounir Moutaouakil
(74) *Attorney, Agent, or Firm* — Birch, Stewart, Kolasch & Birch, LLP

(57) ABSTRACT

A method of transmitting PDCP (Packet Data Convergence Protocol) status reports, is performed by a mobile terminal by receiving, from an upper layer, a request for PDCP (Packet Data Convergence Protocol) re-establishment; detecting whether there are any out-of-sequence PDCP SDUs (service data units) stored; and if there is at least one out-of-sequence PDCP SDU stored, allocating a bitmap field of length in bits equal to the number of PDCP SNs from and not including the first out-of-sequence PDCP SDU up to and including a last out-of-sequence PDCP SDU.

14 Claims, 9 Drawing Sheets

U.S. PATENT DOCUMENTS

| | | |
|---|---|---|
| 7,181,667 B2 | 2/2007 | Argyropoulos et al. |
| 7,227,856 B2 | 6/2007 | Wu |
| 7,227,857 B2 | 6/2007 | Kuo |
| 7,227,868 B2 | 6/2007 | Inden |
| 7,295,573 B2 | 11/2007 | Yi et al. |
| 7,313,116 B2 | 12/2007 | Lee et al. |
| 7,400,593 B2 | 7/2008 | Choi et al. |
| 7,450,933 B2 | 11/2008 | Kwak et al. |
| 7,486,699 B2 | 2/2009 | Yi et al. |
| 7,525,908 B2 | 4/2009 | Olsson et al. |
| 7,616,639 B2 | 11/2009 | Lee et al. |
| 7,706,410 B2 | 4/2010 | Chun et al. |
| 7,710,930 B2 | 5/2010 | Kwak |
| 7,817,595 B2 | 10/2010 | Wu |
| 7,876,771 B2 | 1/2011 | Bergstrom et al. |
| 7,899,026 B2 | 3/2011 | Chun et al. |
| 7,957,755 B2 | 6/2011 | Ishii et al. |
| 7,978,616 B2 | 7/2011 | Chun et al. |
| 8,027,363 B2 | 9/2011 | Chun et al. |
| 8,031,689 B2 | 10/2011 | Guo |
| 8,059,597 B2 | 11/2011 | Park et al. |
| 8,081,662 B2 | 12/2011 | Chun et al. |
| 8,130,687 B2 | 3/2012 | Cai et al. |
| 8,160,012 B2 * | 4/2012 | Chun et al. ............... 370/329 |
| 8,190,144 B2 * | 5/2012 | Chun et al. ............... 455/422.1 |
| 8,203,988 B2 * | 6/2012 | Chun et al. ............... 370/312 |
| 8,243,931 B2 * | 8/2012 | Yi et al. ............... 380/270 |
| 2002/0001314 A1 | 1/2002 | Yi et al. |
| 2002/0009999 A1 | 1/2002 | Lee et al. |
| 2002/0024972 A1 | 2/2002 | Yi et al. |
| 2002/0048281 A1 | 4/2002 | Yi et al. |
| 2002/0114280 A1 | 8/2002 | Yi et al. |
| 2002/0122411 A1 | 9/2002 | Zimmerman et al. |
| 2003/0002472 A1 | 1/2003 | Choi et al. |
| 2003/0006883 A1 | 1/2003 | Kim et al. |
| 2003/0007490 A1 | 1/2003 | Yi et al. |
| 2003/0053485 A1 | 3/2003 | Chuah et al. |
| 2003/0194992 A1 | 10/2003 | Kim et al. |
| 2004/0008659 A1 | 1/2004 | Kim |
| 2004/0076182 A1 | 4/2004 | Wu |
| 2004/0103435 A1 | 5/2004 | Yi et al. |
| 2004/0117860 A1 | 6/2004 | Yi et al. |
| 2004/0146019 A1 | 7/2004 | Kim et al. |
| 2004/0147236 A1 | 7/2004 | Parkvall et al. |
| 2004/0148396 A1 | 7/2004 | Meyer et al. |
| 2004/0151154 A1 | 8/2004 | Wu |
| 2004/0153852 A1 | 8/2004 | Wu |
| 2004/0156330 A1 | 8/2004 | Yi et al. |
| 2004/0184438 A1 | 9/2004 | Terry |
| 2004/0229626 A1 | 11/2004 | Yi et al. |
| 2005/0020260 A1 | 1/2005 | Jeong et al. |
| 2005/0026597 A1 | 2/2005 | Kim et al. |
| 2005/0039101 A1 | 2/2005 | Torsner |
| 2005/0041681 A1 | 2/2005 | Lee et al. |
| 2005/0042987 A1 | 2/2005 | Lee et al. |
| 2005/0047416 A1 | 3/2005 | Heo et al. |
| 2005/0083943 A1 | 4/2005 | Lee et al. |
| 2005/0096017 A1 | 5/2005 | Kim |
| 2005/0100048 A1 | 5/2005 | Chun et al. |
| 2005/0105499 A1 | 5/2005 | Shinozaki et al. |
| 2005/0118992 A1 | 6/2005 | Jeong et al. |
| 2005/0147040 A1 | 7/2005 | Vayanos et al. |
| 2005/0157696 A1 | 7/2005 | Yamamoto |
| 2005/0164683 A1 | 7/2005 | Roberts et al. |
| 2005/0169293 A1 | 8/2005 | Zhang et al. |
| 2005/0192021 A1 | 9/2005 | Lee et al. |
| 2005/0193309 A1 | 9/2005 | Grilli et al. |
| 2005/0201354 A1 | 9/2005 | Hosaka et al. |
| 2005/0213605 A1 | 9/2005 | Kim et al. |
| 2005/0237932 A1 | 10/2005 | Liu |
| 2005/0238051 A1 | 10/2005 | Yi et al. |
| 2005/0254467 A1 | 11/2005 | Li et al. |
| 2005/0259662 A1 | 11/2005 | Kim et al. |
| 2005/0286483 A1 | 12/2005 | Lee et al. |
| 2005/0287957 A1 | 12/2005 | Lee et al. |
| 2006/0007886 A1 | 1/2006 | Lee et al. |
| 2006/0056441 A1 | 3/2006 | Jiang |
| 2006/0067238 A1 | 3/2006 | Olsson et al. |
| 2006/0067289 A1 | 3/2006 | Lee et al. |
| 2006/0067364 A1 | 3/2006 | Jung et al. |
| 2006/0072503 A1 | 4/2006 | Kim et al. |
| 2006/0084389 A1 | 4/2006 | Beale et al. |
| 2006/0092972 A1 | 5/2006 | Petrovic et al. |
| 2006/0128312 A1 | 6/2006 | Declerck et al. |
| 2006/0142020 A1 | 6/2006 | Mueckenheim et al. |
| 2006/0154603 A1 | 7/2006 | Sachs et al. |
| 2006/0154680 A1 | 7/2006 | Kroth et al. |
| 2006/0165045 A1 | 7/2006 | Kim et al. |
| 2006/0182065 A1 | 8/2006 | Petrovic et al. |
| 2006/0203780 A1 | 9/2006 | Terry |
| 2006/0233200 A1 | 10/2006 | Fifield et al. |
| 2006/0251027 A1 | 11/2006 | Chun et al. |
| 2006/0251105 A1 | 11/2006 | Kim et al. |
| 2006/0252445 A1 | 11/2006 | Kim et al. |
| 2006/0264179 A1 | 11/2006 | Bonneville et al. |
| 2006/0268798 A1 | 11/2006 | Kim et al. |
| 2006/0274690 A1 | 12/2006 | Chun et al. |
| 2006/0280145 A1 | 12/2006 | Revel et al. |
| 2007/0047493 A1 | 3/2007 | Park et al. |
| 2007/0053309 A1 | 3/2007 | Poojary et al. |
| 2007/0060139 A1 | 3/2007 | Kim et al. |
| 2007/0079207 A1 | 4/2007 | Seidel et al. |
| 2007/0081513 A1 | 4/2007 | Torsner et al. |
| 2007/0091810 A1 | 4/2007 | Kim et al. |
| 2007/0097913 A1 | 5/2007 | Hanov |
| 2007/0104141 A1 | 5/2007 | Park et al. |
| 2007/0117579 A1 | 5/2007 | Cai et al. |
| 2007/0153788 A1 | 7/2007 | Yi et al. |
| 2007/0183358 A1 | 8/2007 | Cai |
| 2007/0189205 A1 | 8/2007 | Terry et al. |
| 2007/0201397 A1 | 8/2007 | Zhang |
| 2007/0223526 A1 | 9/2007 | Jiang |
| 2007/0250637 A1 | 10/2007 | Jiang |
| 2007/0258591 A1 | 11/2007 | Terry et al. |
| 2007/0268861 A1 | 11/2007 | Diachina et al. |
| 2007/0274278 A1 | 11/2007 | Choi et al. |
| 2007/0297360 A1 | 12/2007 | Joachim et al. |
| 2007/0297367 A1 | 12/2007 | Wang et al. |
| 2008/0002713 A1 | 1/2008 | Fujita |
| 2008/0008152 A1 | 1/2008 | Lohr et al. |
| 2008/0043658 A1 | 2/2008 | Worrall |
| 2008/0045224 A1 | 2/2008 | Lu et al. |
| 2008/0051098 A1 | 2/2008 | Rao |
| 2008/0059859 A1 | 3/2008 | Marinier et al. |
| 2008/0069108 A1 | 3/2008 | Yi et al. |
| 2008/0084851 A1 | 4/2008 | Kim et al. |
| 2008/0089285 A1 | 4/2008 | Pirskanen et al. |
| 2008/0101609 A1 | 5/2008 | Jiang |
| 2008/0146242 A1 | 6/2008 | Alanara et al. |
| 2008/0165717 A1 | 7/2008 | Chen et al. |
| 2008/0165755 A1 | 7/2008 | Marinier et al. |
| 2008/0182609 A1 | 7/2008 | Somasundaram et al. |
| 2008/0186936 A1 | 8/2008 | Chun et al. |
| 2008/0186944 A1 | 8/2008 | Suzuki et al. |
| 2008/0186946 A1 | 8/2008 | Marinier et al. |
| 2008/0212561 A1 | 9/2008 | Pani et al. |
| 2008/0233941 A1 | 9/2008 | Jen |
| 2008/0268878 A1 | 10/2008 | Wang et al. |
| 2008/0273482 A1 | 11/2008 | Lee et al. |
| 2008/0305819 A1 | 12/2008 | Chun et al. |
| 2008/0318566 A1 | 12/2008 | Chun et al. |
| 2008/0318578 A1 | 12/2008 | Worrall |
| 2009/0005058 A1 | 1/2009 | Kazmi et al. |
| 2009/0016301 A1 | 1/2009 | Sammour et al. |
| 2009/0034455 A1 | 2/2009 | Lee et al. |
| 2009/0046631 A1 | 2/2009 | Meylan et al. |
| 2009/0104890 A1 | 4/2009 | Wang et al. |
| 2009/0116434 A1 | 5/2009 | Lohr et al. |
| 2009/0175163 A1 | 7/2009 | Sammour et al. |
| 2009/0232076 A1 | 9/2009 | Kuo |
| 2009/0259908 A1 | 10/2009 | Gollapudi |
| 2010/0008320 A1 | 1/2010 | Yeo et al. |
| 2010/0014466 A1 | 1/2010 | Meyer et al. |
| 2010/0091750 A1 | 4/2010 | Lee et al. |
| 2010/0128648 A1 | 5/2010 | Lee et al. |
| 2010/0142429 A1 | 6/2010 | Yi et al. |
| 2010/0142457 A1 | 6/2010 | Chun et al. |

| | | | | | | | |
|---|---|---|---|---|---|---|---|
| 2010/0157904 | A1* | 6/2010 | Ho et al. ............... 370/328 | WO | WO 2004/042963 A1 | 5/2004 | |
| 2010/0172282 | A1 | 7/2010 | Zhang et al. | WO | WO 2004/073347 A1 | 8/2004 | |
| 2010/0232335 | A1 | 9/2010 | Lee et al. | WO | WO 2005/039108 A2 | 4/2005 | |
| 2010/0254340 | A1 | 10/2010 | Park et al. | WO | WO 2005/078967 A1 | 8/2005 | |
| 2010/0265896 | A1 | 10/2010 | Park et al. | WO | WO 2005/122441 A1 | 12/2005 | |
| 2011/0019604 | A1 | 1/2011 | Chun et al. | WO | WO 2006/009714 A1 | 1/2006 | |
| 2011/0033048 | A1 | 2/2011 | Stanwood et al. | WO | WO 2006/016785 A1 | 2/2006 | |
| 2011/0149865 | A1 | 6/2011 | Lee et al. | WO | WO 2006/033521 A1 | 3/2006 | |
| | | | | WO | WO 2006/052086 A2 | 5/2006 | |

FOREIGN PATENT DOCUMENTS

| | | | | | | |
|---|---|---|---|---|---|---|
| CN | 1396780 A | 2/2003 | WO | WO 2006/083149 A1 | 8/2006 | |
| CN | 1613210 A | 5/2005 | WO | WO 2006/095385 A1 | 9/2006 | |
| CN | 1642067 A | 7/2005 | WO | WO 2006/104335 A2 | 10/2006 | |
| CN | 1761260 A | 4/2006 | WO | WO 2006/104342 A2 | 10/2006 | |
| CN | 1761356 A | 4/2006 | WO | WO 2006/116620 A2 | 11/2006 | |
| CN | 1846365 A | 10/2006 | WO | WO 2006/118435 A1 | 11/2006 | |
| CN | 1868157 A | 11/2006 | WO | WO 2007/020070 A2 | 2/2007 | |
| CN | 1918825 A | 2/2007 | WO | WO 2007/023364 A1 | 3/2007 | |
| CN | 1938969 A | 3/2007 | WO | WO 2007/024065 A1 | 3/2007 | |
| CN | 1954521 A | 4/2007 | WO | WO 2007/039023 A1 | 4/2007 | |
| EP | 1263160 A1 | 12/2002 | WO | WO 2007/045505 A1 | 4/2007 | |
| EP | 1 326 397 A2 | 7/2003 | WO | WO 2007/052900 A1 | 5/2007 | |
| EP | 1 343 267 A2 | 9/2003 | WO | WO 2007/052921 A1 | 5/2007 | |
| EP | 1 508 992 A2 | 2/2005 | WO | WO 2007/078155 A2 | 7/2007 | |
| EP | 1 509 011 A2 | 2/2005 | WO | WO 2007/078173 A1 | 7/2007 | |
| EP | 1638237 A2 | 3/2006 | WO | WO 2007/078174 A1 | 7/2007 | |
| EP | 1 689 130 A1 | 8/2006 | WO | WO 2007/079085 A2 | 7/2007 | |
| EP | 1 768 297 A2 | 3/2007 | WO | WO 2007/089797 A2 | 8/2007 | |
| EP | 1 796 405 A1 | 6/2007 | WO | WO 2007/091831 A2 | 8/2007 | |
| EP | 2026523 A1 | 2/2009 | WO | 2007-312244 A | 11/2007 | |
| EP | 2108223 | 10/2009 | WO | WO 2007/126793 A2 | 11/2007 | |
| JP | 7-162948 A | 6/1995 | WO | WO 2007/147431 A1 | 12/2007 | |
| JP | 2000-324161 A | 11/2000 | WO | WO 2008/010063 A2 | 1/2008 | |
| JP | 2001-197021 A | 7/2001 | WO | WO 2008/094120 A1 | 8/2008 | |
| JP | 2003-18050 A | 1/2003 | WO | WO 2009/035301 A2 | 3/2009 | |
| JP | 2003-115796 A | 4/2003 | | | | |
| JP | 2003-115876 A | 4/2003 | | | | |
| JP | 2003-229925 A | 8/2003 | | | | |
| JP | 2003-283592 A | 10/2003 | | | | |
| JP | 2005-73276 A | 3/2005 | | | | |
| JP | 2006-54718 A | 2/2006 | | | | |
| JP | 2006-505209 A | 2/2006 | | | | |
| JP | 2006-121562 A | 5/2006 | | | | |
| JP | 2006-311543 A | 11/2006 | | | | |
| JP | 2007-116639 A | 5/2007 | | | | |
| JP | 2008-520125 A | 6/2008 | | | | |
| JP | 2009-513058 A | 3/2009 | | | | |
| JP | 2009-521893 A | 6/2009 | | | | |
| KR | 2001-0045783 A | 6/2001 | | | | |
| KR | 2001-0062306 A | 7/2001 | | | | |
| KR | 2002-0004645 A | 1/2002 | | | | |
| KR | 2003-516021 A | 5/2003 | | | | |
| KR | 2003-0060055 A | 7/2003 | | | | |
| KR | 2003-0087914 A | 11/2003 | | | | |
| KR | 10-2004-0034398 A | 4/2004 | | | | |
| KR | 10-2004-0039944 A1 | 5/2004 | | | | |
| KR | 10-2004-0072961 A | 8/2004 | | | | |
| KR | 10-2005-0022988 A | 3/2005 | | | | |
| KR | 10-2005-0081836 A | 8/2005 | | | | |
| KR | 10-2005-0099472 A | 10/2005 | | | | |
| KR | 10-2005-0100882 A | 10/2005 | | | | |
| KR | 10-2005-0103127 A | 10/2005 | | | | |
| KR | 10-2005-0118591 A | 12/2005 | | | | |
| KR | 10-2006-0004935 A | 1/2006 | | | | |
| KR | 10-2006-0014910 A | 2/2006 | | | | |
| KR | 10-2006-0029452 A | 4/2006 | | | | |
| KR | 10-2006-0042858 A | 5/2006 | | | | |
| KR | 10-2006-0069378 A | 6/2006 | | | | |
| KR | 10-2006-0079784 A | 7/2006 | | | | |
| KR | 10-2006-0090191 A | 8/2006 | | | | |
| KR | 10-2006-0134058 A | 12/2006 | | | | |
| KR | 10-2007-0048552 A | 5/2007 | | | | |
| KR | 10-2007-0076374 A | 7/2007 | | | | |
| KR | 10-0907978 B1 | 7/2009 | | | | |
| KR | 10-2009-0084756 A | 8/2009 | | | | |
| RU | 2291594 C2 | 1/2007 | | | | |
| RU | 2304348 C2 | 8/2007 | | | | |
| TW | 496058 B | 7/2002 | | | | |
| WO | WO 01/37473 A1 | 5/2001 | | | | |

OTHER PUBLICATIONS

Alcatel-Lucent, "PDCP Status Report Carrying LIS Only", 3GPP TSG RAN WG2 #61, R2-080902, Jan. 14-18, 2008, pp. 1-2.

LG Electronics Inc., "Correction of Status Report Coding", 3GPP TSG RAN WG2 #61, R2-080969, Feb. 11-15, 2008, pp. 1-3.

LG Electronics, "Correction to PDCP Status Report", 3GPP TSG-RAN2 Meeting #61bis, R2-081594, Mar. 31-Apr. 4, 2008, pp. 1-8.

NTT Docomo, Inc., "Buffer Status Report and Scheduling Request Triggers", 3GPP TSG RAN WG2 #59, R2-073574, Aug. 20-24, 2007, pp. 1-4.

Qualcomm Europe, " Further Details on RACH Procedure", 3GPP TSG-RAN WG1 #48, R1-070649, Feb. 12-16, 2007, pp. 1-4.

Asustek, "On-line recovery of HFN synchronization due to RLC UM SN problem", 3GPP TSG-RAN WG2 meeting #44, R2-041940, Oct. 4-8, 2004, 4 pages.

Itri, "Buffer Status Reporting with Group Combining for LTE", 3GPP TSG-RAN-WG2 Meeting #58bis, R2-072833, Jun. 25-29, 2007, 2 pages.

NEC, "Considerations on Scheduling Information", 3GPP TSG-RAN WG2#59, R2-073556, Aug. 20-24, 2007, 3 pages.

Rapporteur (Asustek), Summary of HFN de-synchronization problem off-line email discussion, 3GPP TSG RAN WG2 #46, Tdoc R2-050318, 4 pages.

3GPP; Digital cellular telecommunications system (Phase 2+); Functional stage 2 description of Location Services (LCS) in GERAN (3GPP TS 43.059 version 7.3.0 Release 7); ETSI TS 143 059 V7.3.0 (May 2007); pp. 1-70, XP014038519.

Catt, Ritt, "Consideration on UL buffer reporting", 3GPP TSG RAN WG2#55, R2-062934, Oct. 9-13, 2006, pp. 1-3, XP002513924.

Ericsson et al.,"Framework for Scheduling Request and Buffer Status Reporting," TSG-RAN WG2 Meeting #60, Tdoc R2-074691, Jeju, Korea, Nov. 5-9, 2007, pp. 1-4.

Ericsson, "Basic Principles for the Scheduling Request in LTE," 3GPP TSG RAN WG2 #54, Tdoc R2-062350, Tallinn, Estonia, Aug. 28-Sep. 1, 2006, 2 pages.

Ericsson, "Scheduling Request in E-UTRAN", 3GPP TSG-RAN WG2 #47bis, R1-670471, Sorrento, Italy, Jan. 15-19, 2007, pp. 1-11, XP050104502.

Kashima, "Method and Apparatus for Providing Timing Alignment", U.S. Appl. No. 60/944,662.

LG Electronics Inc., "UE State Transition in LTE_ACTIVE", 3GPP TSG-RAN WG2 #52, R2-061002, Athens, Greece, Mar. 27-31, 2006, pp. 1-3, XP050130928.

Motorola, "Contention-free Intra-LTE Handover", 3GPP TSG-RAN WG2 #57, R2-070730, St. Louis, USA, Feb. 12-16, 2007, pp. 1-3, XP050133763.

Motorola, "Synchronized Random Access Channel and Scheduling Request," 3GPP TSG RAN1 #47, R1-063046, Riga, Latvia, Nov. 6-10, 2006, 3 pages.

NEC, "Optimised buffer status reporting", 3GPP TSG-RAN WG2# 58bis Meeting, Tdoc R2-072515, Orlando, USA, Jun. 25-29, 2007, 6 pages, XP002503220.

Nokia, "Buffer Reporting for E-UTRAN", 3GPP TSG-RAN WG2 Meeting #52, R2-060829, Athens, Greece, Mar. 27-31, 2006, 5 pages, XP002503218.

Nokia, "Uplink Scheduling for VoIP", 3GPP TSG-RAN WG2 Meeting #57, R2-070476, St. Louis, Missouri, USA, Feb. 12-16, 2007, 15 pages, XP008125208.

NTT DoCoMo et al., "Scheduling Request Transmission Method for E-UTRA Uplink," 3GPP TSG RAN WG1 Meeting #47, R1-063301, (Original R1-062092), Riga, Latvia, Nov. 6-10, 2006, pp. 1-6.

Sammour et al., "Method and Apparatus of Performing Packet Data Convergence Protocol Reset", U.S. Appl. No. 61/019,058.

Texas Instruments, "UL Synchronization Management and Maintenance in E-UTRA", 3GPP TSG RAN WG1 #49, R1-072198, Kobe, Japan, May 7-11, 2007, pp. 1-7, XP050105936.

Texas Instruments, "UL Synchronization Management in LTE_Active", 3GPP TSG RAN WG1 #48bis, R1-071478, St. Julians, Malta, Mar. 26-30, 2007, pp. 1-4, XP050105413.

Wang et al., "Operation of Control Protocol Data Units in Packet IPH-2-Data Convergence Protocol", U.S. Appl. No. 60/976,139.

Wu et al., "Enhanced Random Access Response Formats in E-UTRAN", U.S. Appl. No. 61/006,348.

Zte, "Redundant retransmission restraint in RLC-AM", 3GPP TSG-RAN WG2 meeting #53, R2-061234, Shanghai, China, May 8-12, 2006, pp. 1-5, XP050131180.

3GPP, "Technical Specification Group Radio Access Network; Evolved Universal Terrestrial Radio Access (E-UTRA) Medium Access Control (MAC) protocol specification (Release 8)," 3GPP TS 36.321 V1.0.0, Sep. 2007, pp. 1-18.

3GPP, "Technical Specification Group Radio Access Network; Medium Access Control (MAC) protocol specification (Release 7)," 3GPP TS 25.321 V7.5.0, Jun. 2007, pp. 40-48.

Chairman, "LTE User Plane session report," 3GPP TSG RAN WG2 #59 bis, R2-074536, Oct. 8-12, 2008, Shanghai, China, 24 pages.

Ericsson, "SDU Discard," 3GPP TSG-RAN WG2 #59, Tdoc R2-073230, Athens, Greece, Aug. 20-24, 2007, pp. 1-3.

Motorola, "MAC Header format," 3GPP TSG-RAN2 Meeting #59bis, Tdoc R2-074419, Shanghai, P.R. China, Oct. 8-12, 2007, 3 pages.

Nokia Siemens Networks, "Update on Security, System Information, Mobility, MBMS and DRX," 3GPP TSG-RAN2 Meeting #59, R2-073863, Athens, Greece, Jun. 20-24, 2007, 94 pages.

NTT DoCoMo, Inc., NEC, "MAC PDU structure for LTE," 3GPP TSG RAN WG2 #59 bis, R2-074174, Shanghai, China, Oct. 8-12, 2007, 5 pages.

QUALCOMM Europe, "Scheduling request mechanism," 3GPP TSG-RAN WG1 #48bis, R1-071276, St. Julian, Malta, Mar. 26-30, 2007, pp. 1-4.

Texas Instruments, "Scheduling Request and DRX in E-UTRA," 3GPP TSG RAN WG1 #49bis, R1-072859, Orlando, Florida, Jun. 25-29, 2007, pp. 1-5.

3GPP, "3rd Generation Partnership Project: Technical Specification Group Radio Access Network; Evolved Universal Terrestrial Radio Access (E-UTRA) Radio Link Control (RLC) protocol specification (Release 8)," 3GPP TS 36.322 V8.0.0, Dec. 2007, pp. 11-30.

Ericsson, "Clarification to the handling of large RLC status reports," Change Request, 3GPP TSG-RAN2 Meeting #61bis, Shenzhen, China, Mar. 31-Apr. 4, 2008, R2-082018, 4 pages.

LG Electronics, Inc. et al., "ACK_SN setting for short Status PDU," 3GPP TSG-RAN WG2 #62, May 5-9, 2008, Kansas City, USA, R2-082133, pp. 1-2.

NTT DoCoMo, Inc., "Miscellaneous corrections to TS 36.322," 3GPP TSG-RAN2 Meeting #61bis, Shenzhen, China, Mar. 31-Apr. 4, 2008, Change Request, R2-081700.

Cohen, "An Improved SSCOP-like Scheme for Avoiding Unnecessary Retransmissions and Achieving Ideal Throughput," IEEE, 1996, pp. 855-862, XP010158150.

3GPP, "Universal Mobile Telecommunications System (UMTS); Radio Link Control (RLC) protocol specification (3GPP TS 25.322 version 4.10.0 Release 4)", ETSI TS 125 322, vol. 4.10.0, Sep. 2003, p. 1-78.

LG Electronics Inc., "Correction to Polling Procedure", 3GPP TSG-RAN WG2 #61bis, R2-081588, Mar. 31-Apr. 4, 2008, p. 1-5.

3GPP TS 25.321 V7.5.0 (Jun. 2007), Technical Specification, 3rd Generation Partnership Project; Technical Specification Group Radio Access Network; Medium Access Control (MAC) protocol specification (Release 7), pp. 2-11.

Chairman, "LTE User Plane session report", 3GPP TSG RAN WG2 #59bis, Oct. 8-12, 2008, Shanghai, China, R2-074536, pp. 2-24.

Ericsson, "RLC status report format", Discussion and Decision, TSG-RAN WG2 Meeting #60, Jeju Island, Korea, Nov. 5-9, 2007, Tdoc R2-074701, pp. 1-3.

Jiang, ASUSTeK Computer Inc., HFN de-synchronization detection with Integrity Protection scheme in a wireless communications. U.S. Appl. No. 60/863,800.

LG Electronics, "Update of eUtran PDCP specification", 3GPP TSG-RAN2 Meeting #61, Sorrento, Italy, 11th to 15th of 2008, R2-081390, pp. 2-33.

3GPP TS 36.321 V1.0.0 (Sep. 2007), Technical Specification, 3rd Generation Partnership Project; Technical Specification Group Radio Access Network; Evolved Universal Terrestrial Radio Access (E-UTRA) Medium Access Control (MAC) protocol specification (Release 8), pp. 2-19.

Alcatel-Lucent, "Format for RACH Message 2", 3GPP TSG RAN WG2 #60bis, R2-080176, Jan. 14-18, 2008, 6 pages.

MAC Rapporteurs et al., "E-UTRA MAC protocol specification update", 3GPP TSG-RAN2 Meeting #60bis, R2-080631, Jan. 14-18, 2008, 24 pages.

Motorola, "Design of backoff scheme for LTE", 3GPP TSG-RAN-WG2 Meeting #56bis, Tdoc R2-070143, Jan. 15-19, 2007, 3 pages.

Ghosh et al., "Random Access Design for UMTS Air-Interface Evolution," IEEE, 2007, pp. 1041-1045.

* cited by examiner (a)

(b)

(a)

(b)

METHOD FOR TRANSMITTING PDCP STATUS REPORT

CROSS-REFERENCE

This application is a continuation of U.S. application Ser. No. 12/405,677 filed on Mar. 17, 2009, now U.S. Pat. No. 7,978,616 and U.S. application Ser. No. 12/405,677 claims priority under 35 U.S.C. 119(e) to U.S. Provisional Application Nos. 61/037,309 filed on Mar. 17, 2008, and 61/038,470 filed on Mar. 21, 2008, and under 35 U.S.C. 119(a) to Patent Application No. 10-2009-0022158 filed in the Republic of Korea on Mar. 16, 2009. All of which are hereby expressly incorporated by reference into the present application.

BACKGROUND

The present invention relates to a method for transmitting PDCP status reports. In the related art, transmitting PDCP status reports was performed, but radio resources were unnecessarily wasted. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that a method of for transmitting PDCP status reports is provided, which results in more efficient use of radio resources.

DETAILED DESCRIPTION

The inventive concepts and features herein related to a method for transmitting PDCP status reports are explained in terms of a Long Term evolution (LTE) system or other so-called 4 G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

Figure 1:
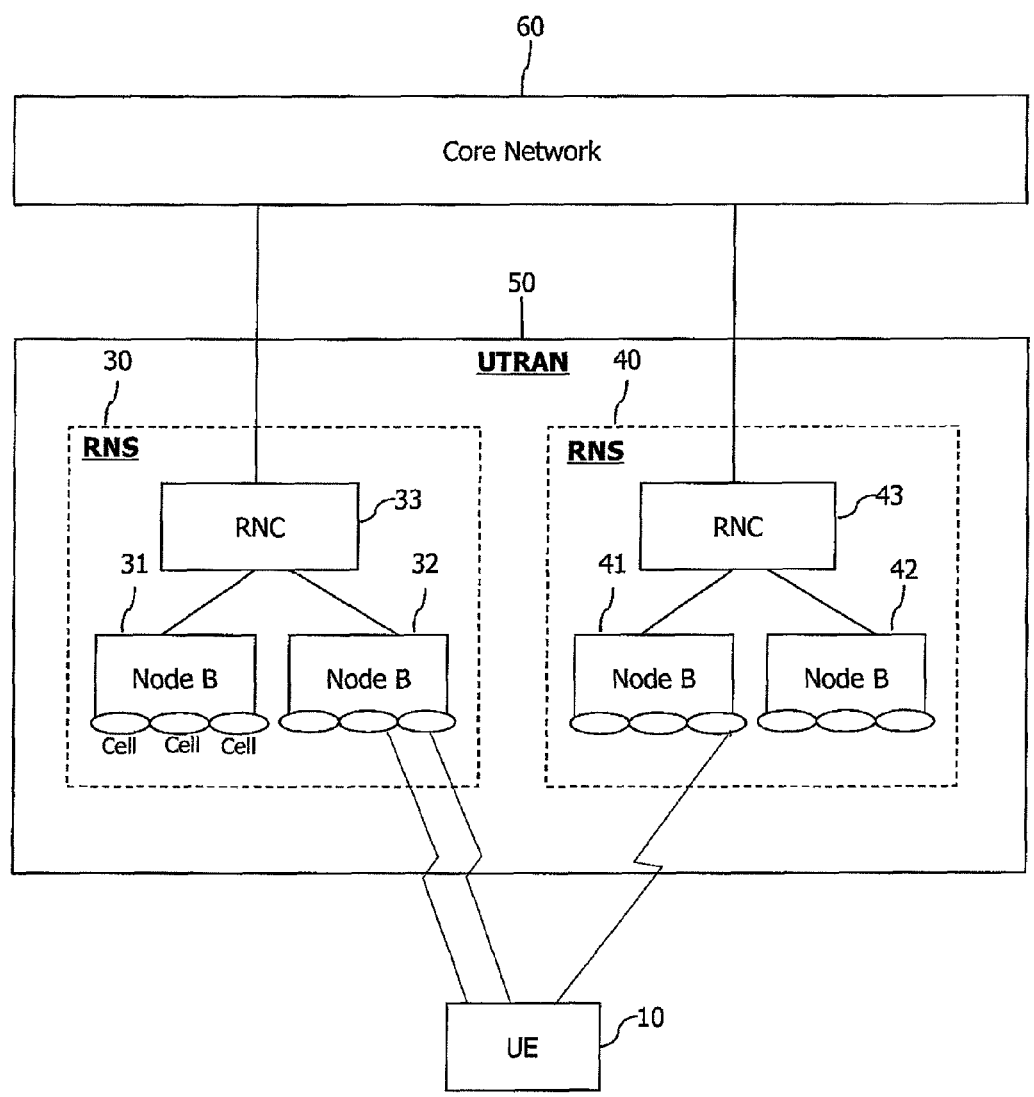
FIG. 1 shows an exemplary network architecture of a Universal Mobile Telecommunications System (UMTS).

FIG. 1 shows the network architecture of a Universal Mobile Telecommunications System (UMTS). The UMTS system is basically comprised of user equipment (UEs) 10, a UMTS Terrestrial Radio Access Network (UTRAN) 50, and a core network (CN) 60. The UTRAN 50 has one or more radio network sub-systems (RNS) 30,40, and each RNS has a radio network controller (RNC) 33,43, and one or more Node Bs 31,32,41,42 that are managed by the RNC 33,43. One or more cells exist for a Node B.

Figure 2:
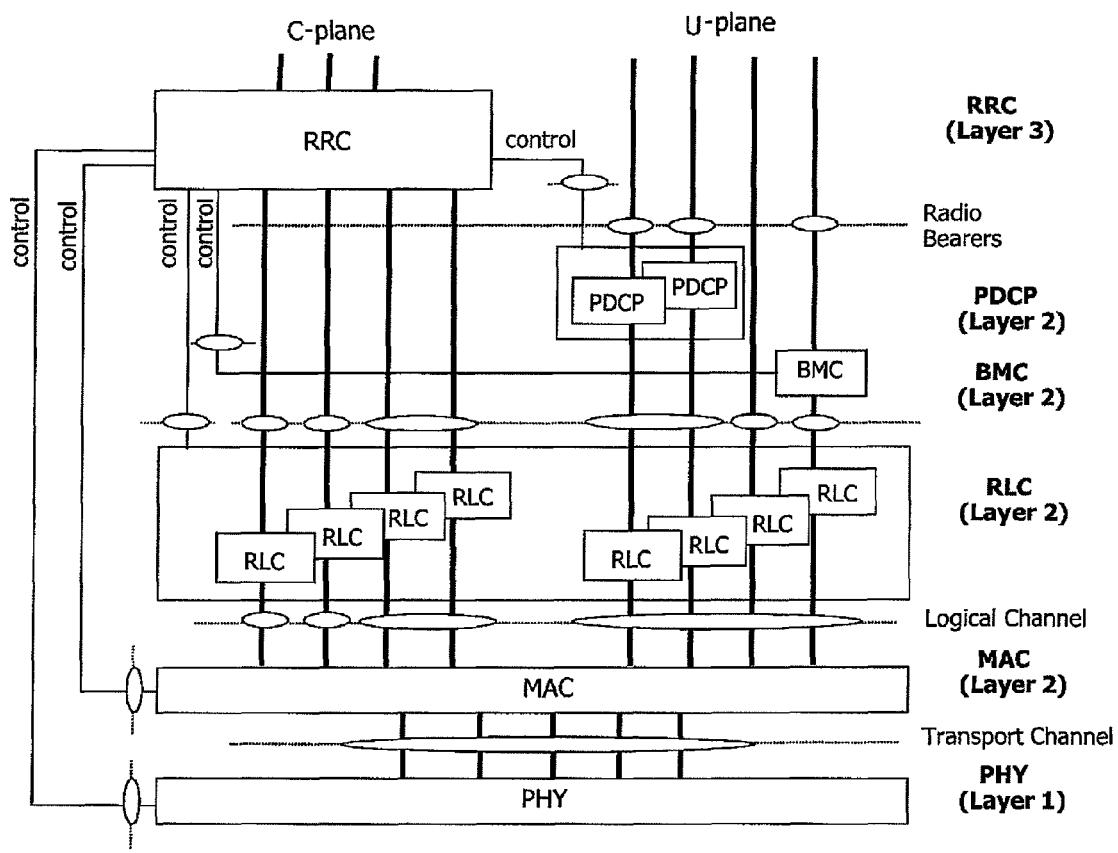
FIG. 2 shows an exemplary radio interface protocol stack used between a mobile terminal and a UTRAN based upon the 3GPP radio access network standard.

FIG. 2 shows the radio protocol stack used in UMTS. The radio protocol layers exist in pairs in the mobile terminal and in the UTRAN, and handle data transmission over the radio interface. This radio protocol stack is largely divided into three layers: L1 (Layer 1), L2 (Layer 2) and L3 (Layer 3).

L1 (Layer 1) has the physical layer (PHY) that uses various types of radio transmission techniques to transmit data with reliability over the radio interface. The PHY layer is connected to an upper layer (the MAC layer) via transport channels, which can be divided into dedicated transport channels and common transport channels.

L2 (Layer 2) is comprised of four sub-layers: MAC, RLC, PDCP and BMC, each of which will be described in more detail below.

The MAC (Media Access Control) layer performs mapping of various logical channels to various transport channels, and also performs logical channel multiplexing of multiple logical channels to a single transport channel. The MAC layer is connected with an upper layer (the RLC layer) via one or more logical channels. Based on the type of information that is transmitted, these logical channels can be divided into control channels used to transmit control plane information and traffic channels used to transmit user plane information. Based on the types of transport channels that are managed, the MAC layer can be divided into a MAC-b sub-layer, a MAC-c/sh sub-layer, a MAC-d sub-layer, a MAC-hs sub-layer, and a MAC-e sub-layer. The MAC-b sub-layer handles the management of a BCH (Broadcast CHannel) used to broadcast system information. The MAC-c/sh sub-layer manages shared transport channels, such as the FACH (Forward Access CHannel), the DSCH (Downlink Shared CHannel), and the like, which are shared with other mobile terminals. The MAC-d sub-layer handles the management of dedicated transport channels, such as the DCH (Downlink Shared Channel), with respect to a particular mobile terminal. In order to support high-speed data transmissions on the downlink and uplink, the MAC-hs sub-layer manages the HS-DSCH (High Speed Downlink Shared CHannel), which is a transport channel for transmitting high-speed downlink data.

The MAC-e sub-layer manages the E-DCH (Enhanced Dedicated CHannel), which is a transport channel for high speed uplink data transmissions.

The RLC (Radio Link Control) layer handles the guarantee of the quality of service (QoS) of each radio bearer (RB) and the transmission of data thereof. For the RLC to guarantee the QoS that is unique to the RB, one or two independent RLC entities exist for each RB, and three types of RLC modes (TM: transparent Mode; UM: Unacknowledged Mode; AM: Acknowledged Mode) are provided to support the various QoS. Also, the RLC adjusts the size of data to be appropriate for transmission over the radio (air) interface by a lower layer, and performs the functions for segmentation and concatenation of the data (Service Data Units: SDUs) received from an upper layer (i.e. RLC layer).

The PDCP (Packet Data Convergence Protocol) layer is located above the RLC layer and allows the data to be transmitted using IP packets (such as IPv4 or IPv6) over the radio (air) interface having relatively small bandwidth in an effective manner. To do so, the PDCP layer performs a header compression function, which allows transmission of data that is only necessary in the header portion of data such that transmission efficiency over the radio (air) interface is increased. The PDCP layer only exists in the PS (Packet Switched) domain because header compression is a basic function, and one PDCP entity exists per RB in order to effectively provide header compression functions with respect to each PS service.

The BMC (Broadcast/Multicast Control) layer exists above the RLC layer and performs the functions related to scheduling of cell broadcast messages and broadcasting to mobile terminals located in a particular cell.

L3 (Layer 3) has the RRC (Radio Resource Control) layer, located at the lowermost portion there of, that is defined only in the control plane, for controlling parameters of L1 and L2 with respect to the establishment, re-establishment and release of radio bearers, as well as controlling the logical channels, transport channels and physical channels. Here, a radio bearer refers to a logical path that is provided by L1 and L2 of the radio protocol for data transfer between the mobile terminal and the UTRAN. In general, establishment of the radio bearer refers to a procedure of setting the characteristics of the radio protocol layers and channels needed for providing a particular service, and then setting each particular parameter and operation methods thereof.

Figure 3:
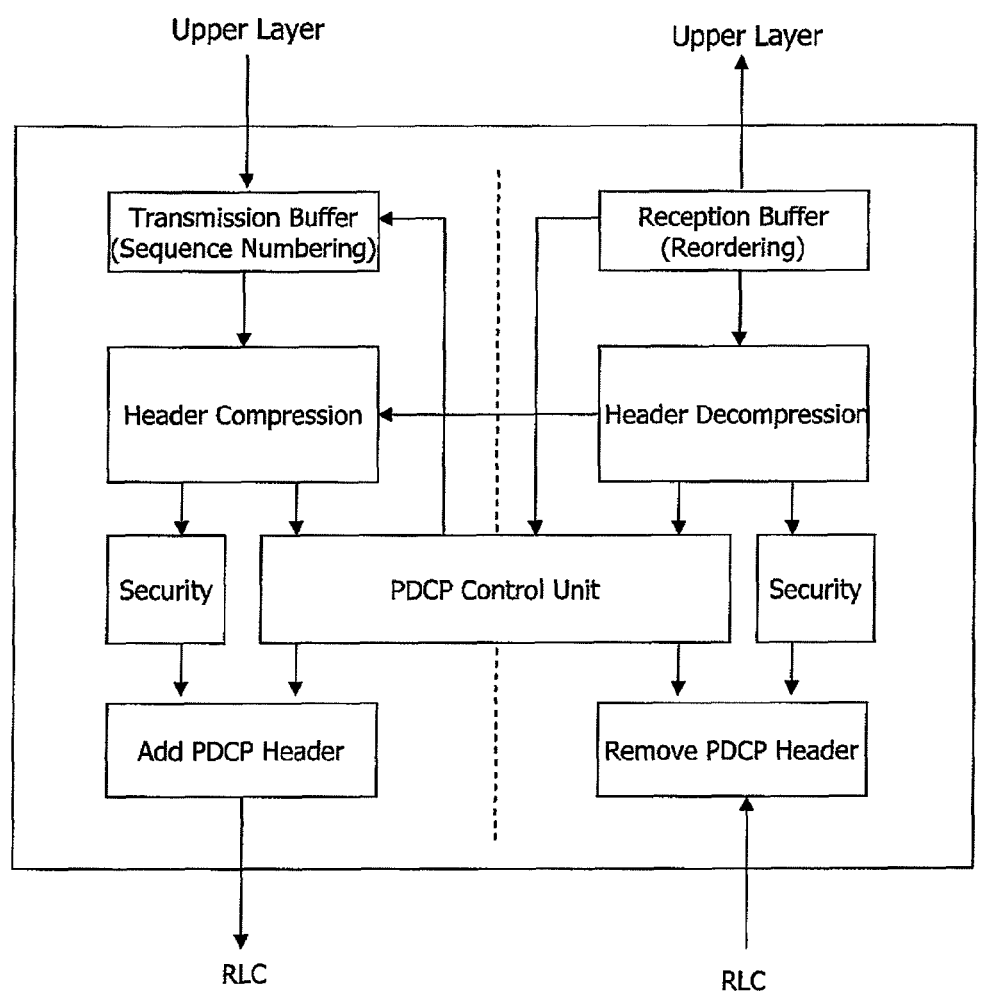
FIG. 3 shows an exemplary PDCP entity if the PDCP layer of FIG. 2.

FIG. 3 will be referred to in describing the PDCP layer in more detail as follows. An exemplary PDCP entity of the PDCP layer of FIG. 2 is shown. The PDCP entity of FIG. 3 is connected to the RRC layer or a user application located thereabove, and connected to the RLC layer therebelow. This PDCP entity is comprised of a transmitting side and a receiving side.

In FIG. 3, the left side depicts the transmitting side having a transmission buffer, a header compression unit, a security handling unit, and a PDCP header attachment unit, while the right side depicts the receiving side having a PDCP header removal unit, security handing unit, header compression cancellation unit and a reception buffer. Such transmitting side and receiving side share a PDCP control unit.

The transmitting side PDCP entity forms PDUs (Protocol Data Units) using SDUs (Service Data Units) received from the upper layer or using control information that was generated by the PDCP entity itself and then transmits such PDUs to a peer PDCP entity (i.e. a PDCP entity within the RNS) at the receiving side. This PDCP entity at the receiving side converts the received PDCP PDUs into PDCP SDUs or extracts control information from the received PDCP PDUs.

It should be noted that the functional blocks shown in FIG. 3 can be implemented in many different ways as could be understood by those skilled in the art.

As mentioned previously, The PDUs generated by the PDCP entity at the transmitting side can be distinguished as Data PDUs and Control PDUs.

The PDCP Data PDU is a data block that is made at the PDCP entity by processing the SDU received from an upper layer. The PDCP Control PDU is a data block that the PDCP entity itself generates in order to transfer control information to a peer PDCP entity.

The PDCP Data PDU is generated for the radio bearer (RB) of both the user plane (U-plane) and of the control plane (C-plane), and some of the PDCP functions are selectively applied to the user plane.

Namely, the header compression function is applied for only the U-plane data, and the integrity protection function among the functions of the security handling unit is applied only for the C-plane data. In addition to the integrity protection function, the security handling unit also has a ciphering function that maintains data security, and such ciphering function applies to both U-plane data and C-plane data.

The PDCP Control PDU is generated only by the radio bearer (RB) of the U-plane, and there are two types: (1) a PDCP status report message (i.e. PDCP Status Report) used to inform the transmitting side about the PDCP entity reception buffer status and (2) a Header Compression Feedback Packet used to inform about the header decompressor state to the header compressor of the transmitting side.

The PDCP status report message (PDCP Status Report message) is transmitted from the receiver PDCP to the transmitter PDCP in order to inform the transmitter PDCP about the PDCP PDUs that were received or not received by the receiver PDCP, such that non-received PDCP SDUs can be retransmitted received PDCP SDUs need not be retransmitted. This PDCP status report message can be send in the form of a PDCP Status PDU, and its exemplary structure is shown in FIG. 4.

Figure 4:
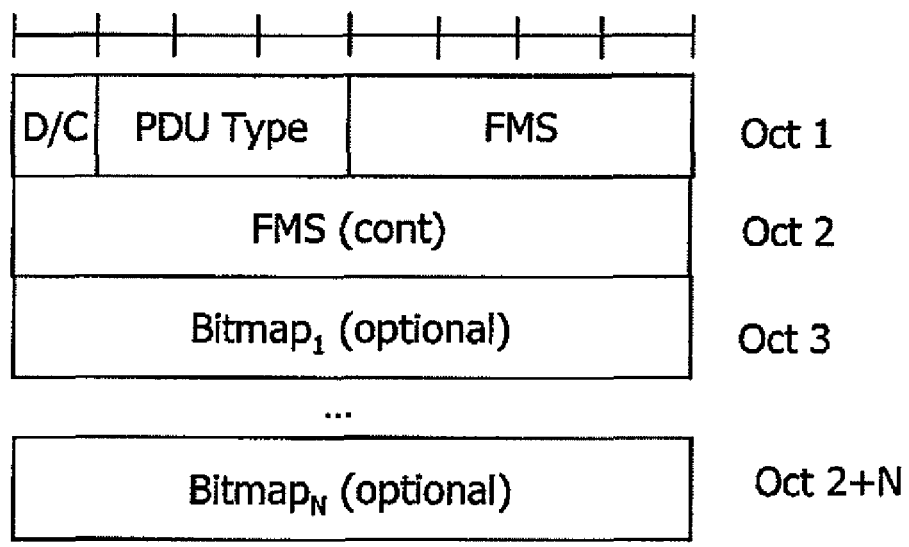
FIG. 4 shows an exemplary PDCP Status PDU generated by the PDCP Control Unit of FIG. 3.

FIG. 4 shows an exemplary PDCP Status PDU generated by the PDCP Control Unit of FIG. 3. As can be seen, the PDCP Status PDU is comprised of one or more octets (1 octet=8 bits) that includes a D/C (Data/Control) field, a PDU Type field, a First Missing Sequence Number (FMS) field, and a bit map (Bitmap) field.

The D/C field is comprised of 1 bit that is used to inform whether the corresponding PDU is a Data PDU or a Control PDU.

The PDU Type field is comprised of 3 bits used to inform about the type of Control PDU. For example, the value of '000' signifies a PDCP Status Report, the value of '001' signifies Header Compression Feedback Information, and other types of values are reserved for future use.

The FMS field is comprised of 12 bits and is used to indicate the sequence number (SN) of the first PDCP SDU that was not received by the receiver (i.e., a first out-of-sequence PDCP SDU, a first not received PDCP SDU, a first missing PDCP SDU, etc.).

The Bitmap field is of variable length, and if a bit value of 0 indicates that the data of that position was not received properly, while a bit of 1 indicates that the data of that position was successfully received.

Such PDCP Status Report can be used for various types of situations that would require PDCP re-establishment, such as handover (HO) situations.

The transmitting side (such as the mobile terminal or Node B) PDCP entity receives PDCP SDUs from the upper layer and stores them a transmission buffer after transmission in case retransmission is later required. Thereafter, when handover (or other PDCP re-establishment situation) occurs, a report about the PDCP SDUs that were received and the PDCP SDUs that were not received are provided via a PDCP Status Report and the PDCP SDUs that were not received are retransmitted after handover.

For example, the PDCP entity in the mobile terminal receives PDCP SDUs from the upper layer, transmits them to the base station, and stores them in a transmission buffer even after transmission. Then, when handover (or some other situation requiring PDCP re-establishment) occurs, the mobile terminal receives information (via a PDCP Status Report that is fed back) about the PDCP SDUs not received by the base station, and such PDCP SDUs are retransmitted.

As described above, when handover (or some other situation requiring PDCP re-establishment) occurs, the Node B changes from the source to the target, and since the PDCP entity also changes, retransmissions must be used.

An example of PDCP Status PDU generation procedure is as follows.

First, after a radio bearer (RB) is configured by the upper layer upon deciding that a PDCP Status Report message should be transmitted, a status report (as indicated below) is compiled, made into a PDU format for transmission, and submitted to the lower layer setting the FMS field to indicate the PDCP Sequence Number of the first missing (or out-of-sequence) PDCP SDU;

allocating, as the length of the Bitmap field, the length of the value (i.e. the number of PDCP sequence numbers) from (and not including) the first not received (out-of-sequence) PDCP SDU up to (and including) the last out-of-sequence PDCP SDU received. Here, this Bitmap field length is 8 bits maximum. If less than 8 bits, rounding up to the next multiple of 8 bits is performed, while if over 8 bits, the next Bitmap field is used;

setting the corresponding bit positions of the Bitmap field as 0. Here, 0 signifies the PDCP SDUs not received from the transmitter by the lower layer or signifies the PDCP SDUs that were received but header decompression was unsuccessful. (Namely, setting as '0' in the corresponding position in the bitmap field all PDCP SDUs that have not been received as indicated by lower layers and optionally, PDCP PDUs for which decompression has failed);

setting the corresponding bit positions of the Bitmap field as 1. Here, 1 signifies other PDCP SDUs (not described above), namely, the PDCP SDUs that were successfully received at the lower layer. (Namely, indicating in the bitmap field as '1' all other PDCP SDUs).

However, the PDCP Status PDU generation procedure above not only is results in situation where unnecessary information is transmitted two times, but also situations where necessary information cannot be transmitted at all.

Figure 5:
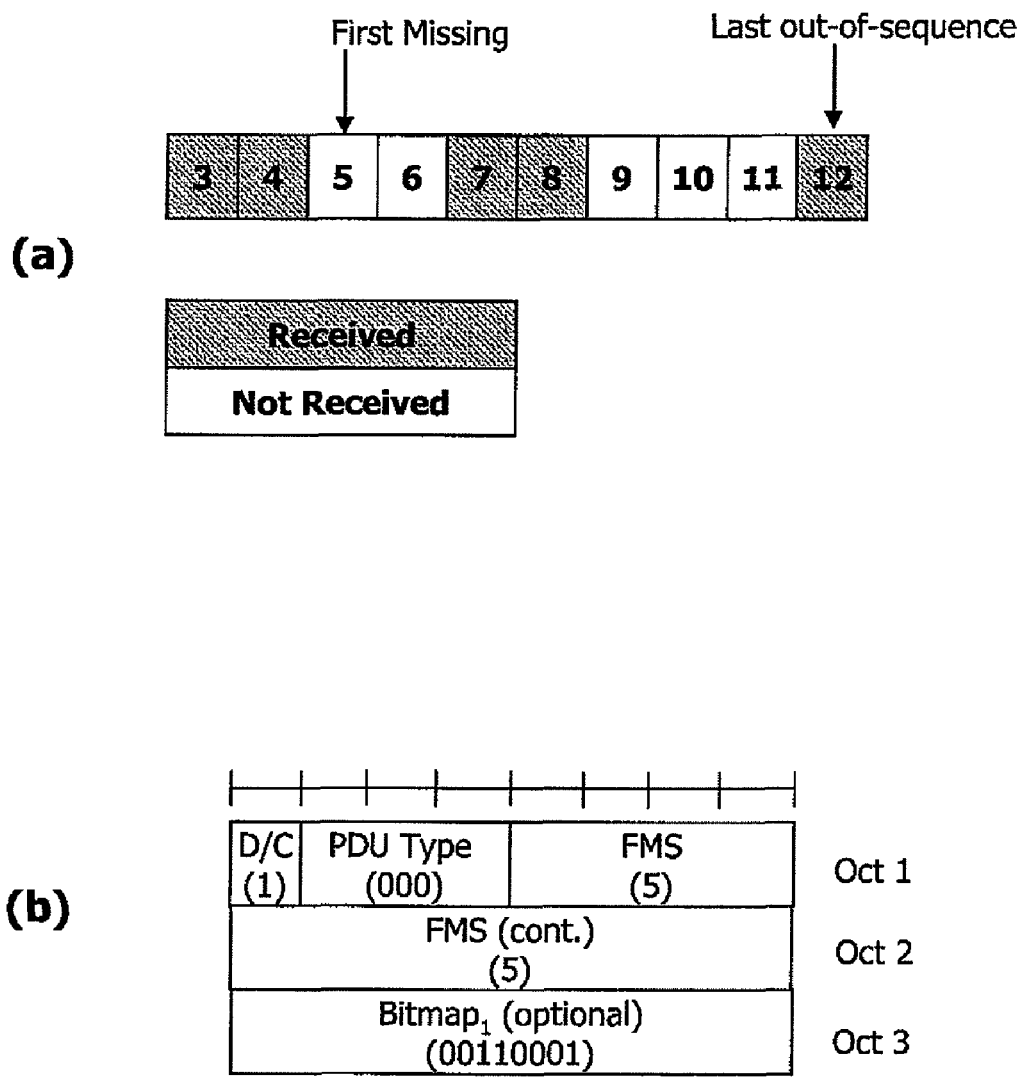
FIG. 5 shows an example of how a PDCP Status PDU is generated.
Figure 6:
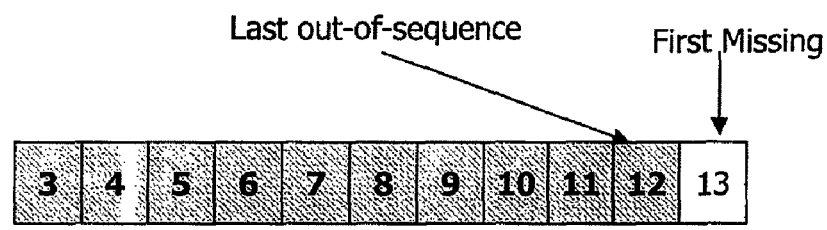
FIG. 6 shows another example of how a PDCP Status PDU is generated.
Figure 6:
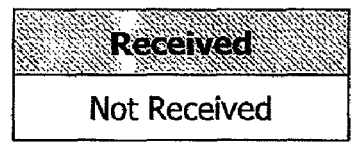
Figure 6:
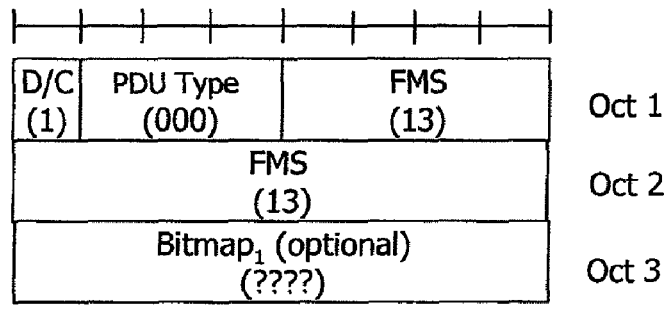

Referring to FIGS. 5 and 6, an exemplary procedure of generating the PDCP Status PDU will be explained below:

FIG. 5 shows one example of generating PDCP Status PDUs.

As shown in (a) of FIG. 5, among a sequence of SDUs having sequence numbers 3 through 12, it is assumed that the lower layer at the receiver has received SDUs of 3, 4, 7, 8, 12, while SDUs of 5, 6, 9, 10, 11 were not received.

In such case, as shown in (b) of FIG. 5, according to this PDCP Status PDU generation procedure, the mobile terminal sets the FMS field to 5, which is the sequence number of the first not received SDU.

Also, as the sequence number of the last out-of-sequence received SDU is 12 (because SDUs 7, 8 were received and SDU 12 was received), a total of 8 bits is needed to express the SDUs having sequence numbers from 5 through 12 (=a total of eight SDUs), and thus a Bitmap field of length 8 is set.

Additionally, with respect to the SDUs having sequence numbers from 5 through 12, the mobile terminal uses each bit of the Bitmap field to express whether reception of each SDU was successful or not. Namely, the Bitmap field would be set to 00110001 for the above situation.

As explained thus far, according to the PDCP Status PDU generation procedure, the information for the SDU corresponding to sequence number 5 is included into the PDCP Status PDU two times (twice), which results in a waste of radio resources.

Also, the last out-of-sequence received SDU (namely, the SDU with SN=12) is always set to 1 in the Bitmap field, and thus such inclusion results in a waste of radio resources.

Additionally, with respect to PDCP SDU 12, which is the last SDU in the above procedure, according to its definition, as this is a successfully received SDU in the receiver PDCP entity, it will always be set to 1. Thus, information about this SDU would not need to be transmitted.

FIG. 6 shows another exemplary procedure for generating a PDCP Status PDU.

As shown in (a) of FIG. 6, among the SDUs having sequence numbers 3 through 13, assume that the lower layer of the receiver received SDUs 3~12, while SDU 13 was not received.

In such case, as shown in (b) of FIG. 6, according to such PDCP Status PDU generating method, the mobile terminal sets the FMS field to 13, which is the sequence number of the SDU that was first not received.

Also, as the last out-of-sequence SDU has a sequence number of 12, expressing the SDUs 12 and 13 requires a size of 2 bits, but upon rounding up (to the nearest multiple of 8), the length of the Bitmap field is 8 bits, thus 1 byte is set.

Additionally, the mobile terminal needs to express whether SDUs 12 and 13 were received or not by using respective bits in the Bitmap field. However, as the last received out-of-sequence SDU has a sequence number of 12, which is lower than the sequence number 13 of the first not received SDU, when each bit to of the Bitmap field is being set, errors occur. Also, as the Bitmap field has a length of 8 bits (=1 byte), while only 2 bits need to be filled, it is unclear as to how the remaining bits are to be filled.

Also, because the receiver properly received all SDUs, only the first not received SDU 13 needs to be reported. Namely, there is no need for the Bitmap field in this situation. Despite this, as described above, the length of the Bitmap field of the PDCP Status PDU is set to 1 byte and transmitted, which results in a waste of radio resources.

Accordingly, based on such problem recognition, the present invention was conceived such that the PDCP Status Report message is generated more effectively, which results in minimizing the waste of radio resources.

Also, the present invention allows for more efficient providing of information related to the SDUs received and not received at the receiver.

To address the above issues, a PDCP status report transmitting method is provided and comprises the steps of receiving a PDCP re-establishment request from an upper layer; determining whether any PDCP SDUs stored out-of-sequence exist; and if an PDCP SDUs stored out-of-sequence exist, then allocating as the length of a Bitmap field of a PDCP Status Report message, the number of bits that equals the number of SDUs from the SDU after the first missing PDCP SDU up to a last received out-of-sequence PDCP SDU.

If no out-of-sequence stored PDCP SDUs exist, the Bitmap field is not included in the PDCP Status Report message.

The PDCP SDUs can be stored in a buffer.

The above steps are performed for an RLC (Radio Link Control) AM (Acknowledged Mode).

The PDCP re-establishment request can occur in a handover situation.

The PDCP Status Report message can also include e FMS field, in which a sequence number of the first missing PDCP SDU is set.

The Bitmap field value of 0 can indicate that the corresponding PDCP SDU was not successfully received, while the Bitmap value of 1 can indicate that the corresponding PDCP SDU was successfully received.

Regarding the effects of the present invention, the size of the PDCP Status Report can be reduced, only necessary information can be included, and more effective use of radio resources can be achieved The features described herein can be applied to the so-called LTE (Long Term Evolution) technologies, which are being developed after 3G mobile communications in anticipation of rapidly increasing data traffic. Such is one aspect of developing an evolved network that can support greater bandwidth, and the term E-UTRAN (Evolved UTRAN) is being used.

However, the features and characteristics described herein are not meant to be limited to LTE, but can also be adapted, applied and implemented in various other communication systems and methods, such as GSM, GPRS, CDMA, CDMA2000, WCDMA, IEEE 802.xx, UMTS, etc.

Hereafter, the term 'mobile terminal' is used, but can also be referred to US (User Equipment), ME (Mobile Equipment), MS (Mobile Station), and the like. Also, a mobile terminal can include highly portable devices having communication functions, such as a portable phone, a PDA, a Smart Phone, a notebook/laptop computer, etc., as well as less portable devices, such as personal computers (PC), vehicle mounted devices, and the like.

The technical terms and phrases used herein are used to describe features in particular embodiments, and are not meant to limit the concepts of the present invention. Also, if a technical term herein is not specifically defined in a different manner, such will be interpreted to have the meaning that one of ordinary skill in the art would understand, without an excessively broad or excessively narrow interpretation. If any terms herein have been erroneously used or not completely technically accurate, then such terms may be clarified or interpreted as those skilled in the art would deem appropriate. Also, certain general terms used herein shall be interpreted according to their dictionary meaning, or interpreted in view of the context without being construed too narrowly.

Also, any words or phrases used herein in the singular may be interpreted to cover their plurality, unless clearly described to the contrary. The word "including" or "comprising" or the like should not be interpreted to mean that the various elements or steps always need to be present. Some elements or steps may not need to be present, or additional elements or steps may also be present.

The words "first" or "second" or other terms that connote an order or sequence may be used to describe various different elements or steps to provide distinguishing therebetween, unless specified that the numerical order is of some significance. For example, without exceeding the scope of the present invention, a first element can also be explained as a second element, while a second element can also be explained as a first element.

For any description about one element being "connected to" or "connected with" or the like, with respect to another element, a direct connection may be possible or an intermediate element may exist between the two elements. On the other hand, if two elements are described to be "directly" connected together, this may mean that no other elements exists therebetween.

Hereafter, with reference to the attached drawings, some embodiments will be explained, and regardless of the reference numbers in the drawings, some elements may be labeled with the same reference numbers and any repetitive explanations may have been omitted merely for the sake of brevity. Also, certain aspects of the related or conventional art, which may be a basis for the present invention, may have not been explained but could be understood by those skilled in the art. The features shown in the attached drawings are merely depicted to improve the understanding of the present invention and should not be interpreted to limit the teachings of the present invention. As such, various modifications, changes, equivalents and replacements are part of the inventive features described throughout this description.

Figure 7:
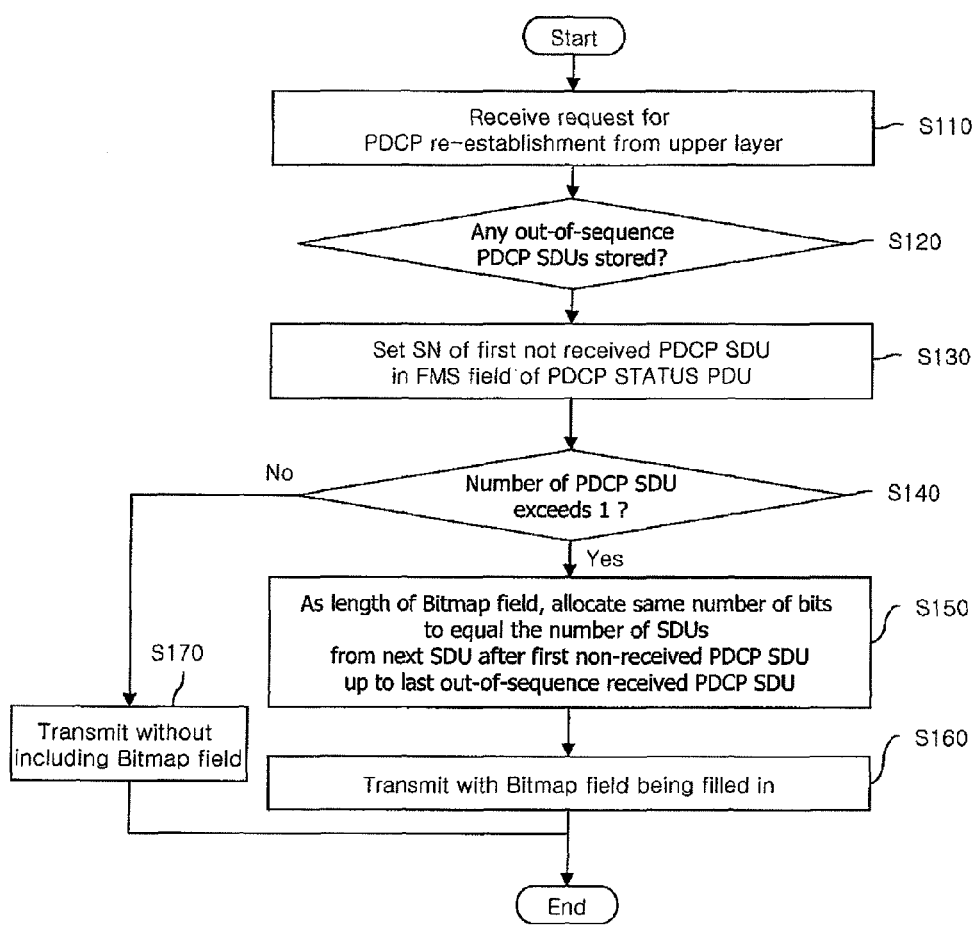
FIG. 7 shows an exemplary flow chart of the present invention.

FIG. 7 shows an example of a flowchart that depicts a PDCP Status Report procedure of the present invention. It can be understood that the total number of SDUs, starting from the SDU after the first missing PDCP SDU and up to the last received out-of-sequence PDCP SDU, are counted and a corresponding number of bits are allocated to the length of the Bitmap field. Thus, in the present invention, with respect to the RB established to transmit the PDCP status report message, when allocating the length of the Bitmap field of the PDCP Status PDU in the PDCP status report message, the first missing PDCP SDU is not considered, but the SDU after the first missing PDCP SDU and up to the last received out-of-sequence PDCP SDU.

First, the PDCP layer receives, from an upper layer, a PDCP re-establishment request with respect to a radio bearer (RB) (S110). Here, the PDCP re-establishment request may occur for a handover situation of a mobile terminal.

Then, for the RB, it is checked to see if there are any non-sequential (or out-of-sequence) PDCP SDUs that were stored (S120).

If so, the value of the sequence number (SN) of the first not received PDCP SDU is used to set the FMS field of the PDCP Status PDU (S130).

Also, the total number of PDCP SDU not received (i.e. missing PDCP SDUs) is determined, and checked to see if such exceeds 1 (S140). If the total number is 1 or less, the Bitmap field is not included in the PDCP Status PDU (S170). However, as an alternative, the Bitmap field can be set according to procedure S150 and included.

If the total number exceeds 1, then within a range defined from the very next SDU right after the first not received PDCP SDU up to the last received PDCP SDU (in other words, among the non-sequentially received PDCP SDUs, the PDCP SDU having the highest sequence number, namely, the last out-of-sequence PDCP SDU), the total number of PDCP SDUs within such range is obtained and the same number of bits in the Bitmap field is set as its length (S150).

In other words, a Bitmap field having a length in bits that is equal to the total number of PDCP SDUs (Sequence Numbers) from and not including the first missing PDCP SDU up to and including the last out-of sequence PDCP SDU is allocated.

Here, the number of bits is rounded up by multiples of 8, in order to determine the length of the Bitmap field. When obtaining the total number, the counting can be based on the PDCP SDUs or the PDCP PDUs. When PDCP PDUs are to be used, then the number of PDCP Control PDUs is excluded, and only the number of PDCP Data PDUs is used.

In the above procedure (S150) for setting the length of the Bitmap field, the first not received PDCP SUD is excluded from consideration, but the last out-of-sequence PDCP SDU is considered. Alternatively, the last out-of-sequence PDCP SDU may sometimes be excluded, because such is successfully received and always set to 1. In such case, the PDCP SDU just before the last out-of-sequence PDCP SDU is considered.

Thereafter, based in the Bitmap field length, the Bitmap field is filled and the transmitted (S160). Here, the Bitmap field has a first position bit containing information for a PDCP SDU having a sequence number equal to FMS field value+1, which is set to 1 is successfully received or set to 0 is not successfully received. As such, the Bitmap field has an Nth position bit containing information for a PDCP SDU having a sequence number equal to FMS field value+N, which is set to 1 is successfully received or set to 0 is not successfully received.

This can be described in terms of the following Table:

| Bit | Description |
| --- | --- |
| 0 | Sequence Number = FMS field value + Bitmap, corresponding bit position N value for PDCP SDU modulo 4096 was not successfully received at receiver. The Nth bit position is N in Bitmap field. I.e. the first bit position of Bitmap field is 1. |
| 1 | Sequence Number = FMS field value + Bitmap, corresponding bit position N value for PDCP SDU modulo 4096 was successfully received at receiver and no need for retransmission. The Nth bit position is N in Bitmap field. I.e. the first bit position of Bitmap field is 1. |

As described thus far, according to the present invention, the first position bit of the BitMap field is used to inform about whether the PDCP SDU (having a sequence number corresponding to the FMS field value+1) was successfully received or not.

Also, according to the present invention, only when there are 2 or more PDCP SDUs that were not successfully received, by including the BitMap field into the PDCP Status Report message, radio resources can be effectively used.

Figure 8:
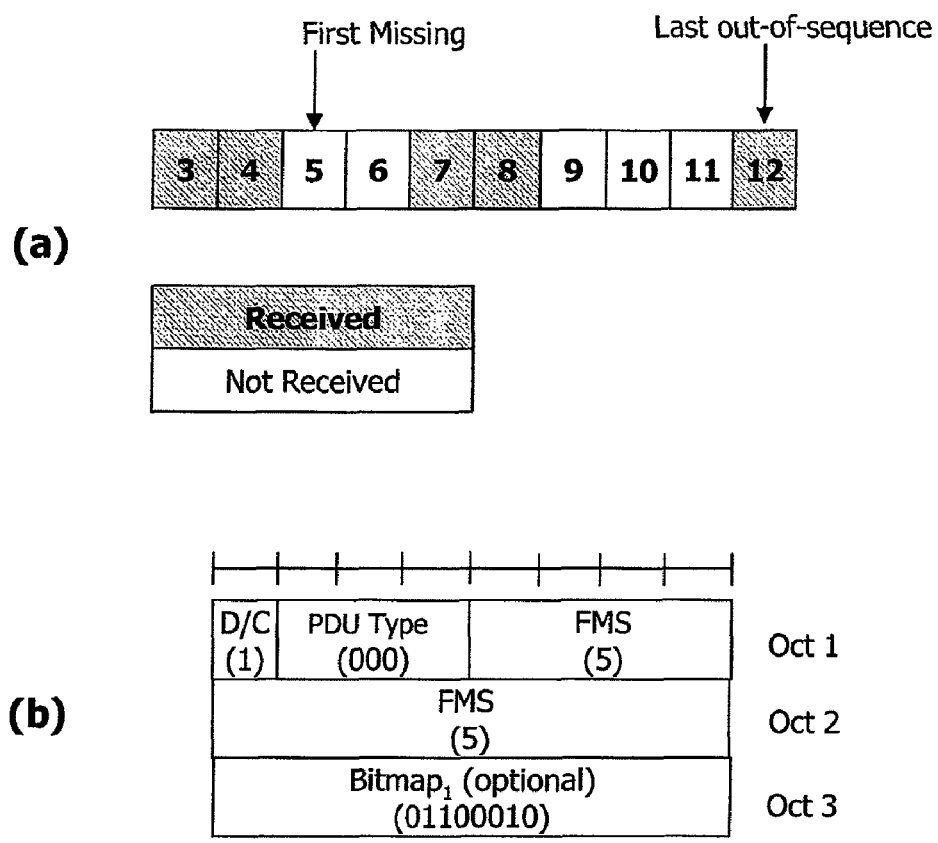
FIG. 8 shows an example of how a PDCP Status PDU is generated.

FIG. 8 shows another example of generating a PDCP Status PDU.

As shown in (a) of FIG. 8, among the sequential SDUs having sequence numbers from 3 through 12, the receiver lower layer received SDUs of 3,4,7,8,12, while SDUs of 5,6,9,10,11 were not received In such case, as shown in (b) of FIG. 8, according to the method of the present invention, the mobile terminal PDCP layer sets 5 into the FMS field, 5 being the sequence number of the first missing (not received).

Also, for the SDU after the first not received SDU, starting from such SDU having a sequence number of 6 up to the last received non-sequential (or out-of-sequence) SDU having a sequence number of 12 (because, SDUs 7,8 are received, and SDU 12 is received), because the needed bits are 7 bits, upon rounding up to the 8 bit level, the Bitmap field length is set to 8 bits.

Also, the mobile terminal PDCP layer indicates whether reception of each SDU having sequence numbers 6 through 12 was successfully, and expressed by the bits of the Bitmap field. Here, such Bitmap field would have set 01100010.

Here, the bit at the first position of the Bitmap field indicates whether the PDCP SDU having SN=6 was successfully received or not.

Figure 9:
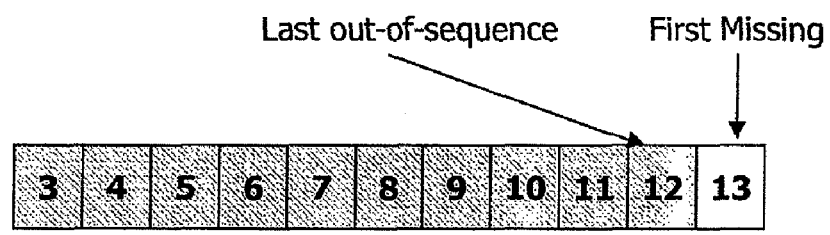
FIG. 9 shows an example of how a PDCP Status PDU is generated.
Figure 9:
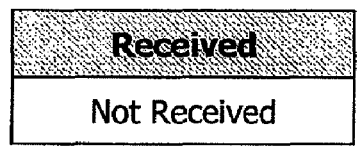
Figure 9:
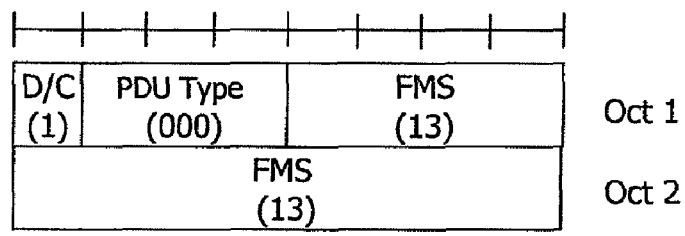

FIG. 9 shows another embodiment about the PDCP Status PDU generating procedure.

As shown in (2) of FIG. 9, among the sequential SDUs having sequence numbers 3 through 13, it is assumed that the lower layer of the receiving mobile terminal received SDUs 3~12, and SDU 13 is not received.

As such, as shown in (b) of FIG. 9, the PDCP layer of the mobile terminal sets into the FMS field, the sequence number 13 of the first not received SDU (S130).

Also, because it is found that the number of not received PDCP SDUs does not exceed 1 (S140), the Bitmap field is not included into the PDCP Status PDU (S170).

Referring back to FIG. 7, it was explained that alternatively, the Bitmap field could be included in the PDCP STATUS PDU. If reception is made as in (a) of FIG. 9, and the PDCP STATUS PDU includes the Bitmap field, in the procedure for setting the length of the Bitmap field (S150), the last received out-of-sequence PDCP PDU can also be excluded from consideration. This is because the last received out-of-sequence PDCP PDU is always in sequence with the sequence number of the PDCP SDU with successful reception, such information can be indirectly included and informed. In such case, the procedure for setting the length of the Bitmap field (S150) may be modified as follows.

The total number of PDCP SDUs having a sequence number within a range beginning from the PDCP SDU that has a sequence number that is immediately after that of the first not received PDCP SDU among the received out-of-sequence PDCP SDUs, and up to the PDCP SDU having a sequence number just prior to the last out-of-sequence PDCP SDU having the highest sequence number is obtained, and the Bitmap field size is set the have the same number of bits as the obtained total number of PDCP SDUs. Namely, when setting the Bitmap length, the first not received PDCP SDU is excluded from consideration and the last received out-of-sequence PDCP SDU is also excluded.

The method of the present invention explained thus far can be implemented in software, hardware, or a combination thereof. For example, the method of the present invention can be implemented as codes or commands of a software program that can be executed by a processor (CPU), and can be saved in a storage medium (e.g. memory, hard disk, etc.).

Certain aspects for the method of the present invention may be implemented in a mobile terminal or network entity (such as the RNC or Node B of is FIG. 1). The mobile terminal or network entity may include the protocols of FIGS. 2 and 3, as can be understood by those skilled in the art.

Thus far, some exemplary embodiments of the present invention have been described, but such embodiments are not meant to limit the features described herein. As such, all reasonable and various modifications, changes, improvement and variations are part of the present invention.

INDUSTRIAL APPLICABILITY

The features and concepts herein are applicable to and can be implemented in various types of user devices (e.g., mobile terminals, handsets, wireless communication devices, etc.) and/or network entities that can be configured to support a method for transmitting PDCP status reports.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method comprising:
processing, by a PDCP (Packet Data Convergence Protocol) entity located between upper layers and lower layers of a radio interface protocol stack, PDCP data units received from the lower layers after a PDCP re-establishment is requested from the upper layers;
compiling, by the PDCP entity, a PDCP status report by,
setting an FMS (First Missing Sequence number) field to a PDCP sequence number (SN) of a first missing PDCP SDU (Service Data Unit),
if there is at least one out-of-sequence PDCP SDU stored, allocating a bitmap field of length in bits equal to the number of PDCP SNs from and not including the first missing PDCP SDU up to and including a last out-of-sequence PDCP SDUs, rounded up to the next multiple of 8,
indicating a '0' in corresponding positions of the bitmap field for all PDCP SDUs that have not been received as indicated by the lower layers, and
indicating a '1' in corresponding positions of the bitmap field for all other PDCP SDUs; and
sending, from the PDCP entity to the lower layers, the PDCP status report as a PDCP PDU (Protocol Data Unit) for transmission to a peer PDCP entity at a receiving side.

2. The method of claim 1, wherein the compiling step is performed if a radio bearer is configured by the upper layers to send the PDCP status report via uplink transmission.

3. The method of claim 1, wherein the step of indicating a '0' in corresponding positions of the bitmap field is optionally also performed for PDCP SDUs for which decompression has failed.

4. The method of claim 1, wherein the steps are performed for an RLC (Radio Link Control) AM (Acknowledged Mode).

5. The method of claim 1, wherein the PDCP re-establishment occurs for handover (HO) situations.

6. The method of claim 1, wherein the PDCP status report as the PDCP PDU is a PDCP Control PDU with a format including a D/C (Data/Control) field of 1 bit, followed by a PDU Type field of 3 bits, followed by the FMS field of 12 bits, and optionally followed by the bitmap field of 8 bits or a multiple thereof.

7. A method comprising:
receiving, by a PDCP (Packet Data Convergence Protocol) entity located between upper layers and lower layers of a radio interface protocol stack, a PDCP status report as a PDCP PDU (Protocol Data Unit) transmitted from a peer PDCP entity at a transmitting side,
said PDCP status report generated in the peer PDCP entity at the transmitting side by,
processing PDCP data units received from the lower layers at the transmitting side after a PDCP re-establishment is requested from the upper layers at the transmitting side,
compiling the PDCP status report by
setting an FMS (First Missing Sequence number) field to a PDCP sequence number (SN) of a first missing PDCP SDU (Service Data Unit),
if there is at least one out-of-sequence PDCP SDU stored, allocating a bitmap field of length in bits equal to the number of PDCP SNs from and not including the first missing PDCP SDU up to and including a last out-of-sequence PDCP SDUs, rounded up to the next multiple of 8,
indicating a '0' in corresponding positions of the bitmap field for all PDCP SDUs that have not been received as indicated by the lower layers at the transmitting side, and
indicating a '1' in corresponding positions of the bitmap field for all other PDCP SDUs; and
sending the PDCP status report from the peer PDCP entity at the transmitting side; and
processing the PDCP status report received from the peer PDCP entity at the transmitting side.

8. The method of claim 7, wherein the compiling step is performed by the peer PDCP entity at a transmitting side if a radio bearer is configured by the upper layers to send the PDCP status report via uplink transmission.

9. The method of claim 7, wherein the step of indicating a '0' in corresponding positions of the bitmap field is optionally also performed by the peer PDCP entity at a transmitting side for PDCP SDUs for which decompression has failed.

10. The method of claim 7, wherein the steps are performed for an RLC (Radio Link Control) AM (Acknowledged Mode).

11. The method of claim 7, wherein the PDCP re-establishment occurs for handover (HO) situations.

12. The method of claim 7, wherein the PDCP status report as the PDCP PDU is a PDCP Control PDU with a format including a D/C (Data/Control) field of 1 bit, followed by a PDU Type field of 3 bits, followed by the FMS field of 12 bits, and optionally followed by the bitmap field of 8 bits or a multiple thereof.

13. An apparatus comprising:
a PDCP (Packet Data Convergence Protocol) entity at a transmitting side;
upper layers located above the PDCP entity in a radio interface protocol stack; and
lower layers located below the PDCP entity in the radio interface protocol stack,
wherein the PDCP entity at the transmitting side is configured to perform,
processing PDCP data units received from the lower layers after a PDCP re-establishment is requested from the upper layers;
compiling a PDCP status report by,
setting an FMS (First Missing Sequence number) field to a PDCP sequence number (SN) of a first missing PDCP SDU (Service Data Unit),
if there is at least one out-of-sequence PDCP SDU stored, allocating a bitmap field of length in bits equal to the number of PDCP SNs from and not including the first missing PDCP SDU up to and including a last out-of-sequence PDCP SDUs, rounded up to the next multiple of 8,
indicating a '0' in corresponding positions of the bitmap field for all PDCP SDUs that have not been received as indicated by the lower layers, and
indicating a '1' in corresponding positions of the bitmap field for all other PDCP SDUs; and
sending, to the lower layers, the PDCP status report as a PDCP PDU (Protocol Data Unit) for transmission to a peer PDCP entity at a receiving side.

14. An apparatus comprising:
a PDCP (Packet Data Convergence Protocol) entity at a receiving side;
upper layers located above the PDCP entity in a radio interface protocol stack; and lower layers located below the PDCP entity in the radio interface protocol stack,
wherein the PDCP entity at the receiving side is configured to perform,
receiving a PDCP status report as a PDCP PDU (Protocol Data Unit) transmitted from a peer PDCP entity at a transmitting side,
said PDCP status report generated in the peer PDCP entity at the transmitting side by,
processing PDCP data units received from the lower layers at the transmitting side after a PDCP re-establishment is requested from the upper layers at the transmitting side,
compiling the PDCP status report by
setting an FMS (First Missing Sequence number) field to a PDCP sequence number (SN) of a first missing PDCP SDU (Service Data Unit),
if there is at least one out-of-sequence PDCP SDU stored, allocating a bitmap field of length in bits equal to the number of PDCP SNs from and not including the first missing PDCP SDU up to and including a last out-of-sequence PDCP SDUs, rounded up to the next multiple of 8,
indicating a '0' in corresponding positions of the bitmap field for all PDCP SDUs that have not been received as indicated by the lower layers at the transmitting side, and
indicating a '1' in corresponding positions of the bitmap field for all other PDCP SDUs; and
sending the PDCP status report from the peer PDCP entity at the transmitting side; and
processing the PDCP status report received from the peer PDCP entity at the transmitting side.

* * * * *